United States Patent [19]
Ishikawa et al.

[11] Patent Number: 4,684,208
[45] Date of Patent: Aug. 4, 1987

[54] OPTICAL BRANCHING ELEMENT

[75] Inventors: Haruo Ishikawa, Oume; Yoshimasa Fujii, Funabashi, both of Japan

[73] Assignee: Sumitomo Metal Mining Company Limited, Tokyo, Japan

[21] Appl. No.: 704,174

[22] Filed: Feb. 22, 1985

[30] Foreign Application Priority Data

Feb. 29, 1984 [JP] Japan .................................. 59-37965

[51] Int. Cl.$^4$ ............................................. G02B 6/28
[52] U.S. Cl. ................................ 350/96.15; 350/96.16
[58] Field of Search ............... 350/96.15, 96.16, 96.18, 350/96.19, 96.20, 96.21

[56] References Cited
U.S. PATENT DOCUMENTS

| | | | |
|---|---|---|---|
| 3,874,781 | 4/1975 | Thiel | 350/96.16 |
| 3,883,223 | 5/1975 | Hudson | 350/96.18 X |
| 4,479,697 | 10/1984 | Kapany et al. | 350/96.19 X |

*Primary Examiner*—Eugene R. LaRoche
*Assistant Examiner*—Steven J. Mottola
*Attorney, Agent, or Firm*—Watson, Cole, Grindle & Watson

[57] ABSTRACT

An optical branching element mainly composed of a central linear optical transmission line and a plurality of peripheral linear optical transmission lines. They have circular sections of approximately the same diameters. The peripheral linear optical transmission lines are provided around the central linear optical transmission line such that their end surfaces are arranged on the same plane as the end surface of the central linear optical transmission line. A holder fixes these central and peripheral linear optical transmission lines on the end surface side. Semispheric reflecting concave surfaces having radii larger than the diameters of said peripheral linear optical transmission lines are formed around the contact points of the end surface of the central linear optical transmission line and the end surfaces of the linear optical transmission lines. A reflector which is provided in opposed contact with the contacting surface of the holder incorporates a plurality of semispherical reflecting concave surfaces as a reflecting concave surface.

11 Claims, 8 Drawing Figures

OPTICAL BRANCHING ELEMENT

BACKGROUND OF THE INVENTION

This invention relates to an optical branching element which is used for an optical communication system, an optical measuring system or the like.

A bilateral optical communication transmission line has been used which is composed of one central information processing unit and a plurality of terminal units which are in remote places and are connected to the central information processing unit by a trunk optical fiber and branch optical fibers which are branched from the trunk optical fiber, such that different pieces of information can be transmitted from the plurality of terminal units to the central information processing unit and conversely a common piece of information can be transmitted from the central information processing unit to each terminal unit. In this optical communication transmission line, it is necessary to optically connect the trunk optical fiber and branch optical fibers which are connected to each terminal unit with optical branching-/joining elements.

Heretofore as an optical branching/joining element for use in such a case, that which utilizes a reflection film such as a half-mirror and that which utilizes coupling between optical fibers have been proposed. That which utilizes a reflection film has an advantage in that the branching ratio of a transmitted optical signal can be varied over a wide range by selecting a characteristic of the reflection film, but branching is limited to one direction with respect to a single reflection film. Therefore, in order to provide branching in a plurality of directions, such as two or three, there needs to be two or three reflection films.

In the construction of such a transmission line which uses a reflection film, optical transmission characteristics largely depend on the location of the optical fiber, the SELFOC lens and the reflection film. Therefore, many stages of a delicate locating process are required in the construction of this kind of transmission line which uses reflection films.

On the other hand, in the type which utilizes coupling between optical fibers it is necessary to remove the coatings of the optical fibers to be coupled, and after a minute processing of the coupling portions of the optical fibers with the object of tapering them, the optical fibers are optically connected in such a manner as to join them at the tapered portions. This type which utilizes coupling has the following drawbacks: the preliminary minute processing necessary for joining them is delicate, whereby it is difficult to obtain a secured product; and it is susceptible to external influences such as heat and vibration.

SUMMARY OF THE INVENTION

Accordingly it is an object of the invention to eliminate the above drawbacks and to provide an optical branching element which has a simple and stable structure, which can be produced easily and in mass-production, and which is not susceptible to external influences such as heat and vibration.

To achieve this end, an optical branching element according to the invention is mainly composed of a central linear optical transmission line having a circular section and peripheral linear optical transmission lines each of which has a circular section and approximately the same diameter as the central linear optical transmission line. The peripheral linear optical transmission lines are provided such that their end surfaces are on the same plane as and come into contact with the end surface of the central linear optical transmission line and such that the peripheral linear optical transmission lines come into contact with the peripheral surface of the central linear optical transmission line on one side. In the state where the peripheral linear optical transmission lines are provided, as described above, in contact with the peripheral surface of the central linear optical transmission line, these optical transmission lines are fixed by a holder with their end surfaces arranged on the same plane. In fixing them, a contacting surface which is on the same level as the end surface of each of the optical transmission lines is formed on the holder.

On the other hand, a reflector is provided which is in opposed contact with the contacting surface of the holder. On this reflector semi-spherical reflecting concave surfaces having larger radii than the diameters of the peripheral linear optical transmission lines are formed around the contact points of the end surfaces of the peripheral linear optical transmission lines and the end surface of the central linear optical transmission line, and in correspondence with each peripheral linear optical transmission line. A succession of these semi-spherical reflecting concave surfaces forms a reflecting concave surface in the reflector.

By virtue of this structure of an optical branching element according to the invention, an optical signal which is propagated through the central linear optical transmission line can be transmitted through the reflecting concave surface very effectively with a small loss to the peripheral linear optical transmission lines which are provided in contact with the peripheral surface of the central linear transmission line on the end surface side. The structure is simplified as a whole and the propagation characteristics are not susceptible to external influences such as temperature change and vibration. In addition, this can be mass produced at a low cost of manufacture.

BRIEF DESCRIPTION OF THE DRAWINGS

The above and other objects, features and advantages of the present invention will become clear from the following description of the preferred embodiments thereof, taken in conjunction with the accompanying drawings.

DESCRIPTION OF THE PREFERRED EMBODIMENTS

In this invention, a central linear optical transmission line and peripheral linear optical transmission lines are composed of optical fibers themselves or optical fibers and filter films which are provided in contact with the end surfaces of the optical fibers. The optical fibers used may be either of the single-mode type or of the multi-mode type.

A first embodiment uses optical fibers for the central linear optical transmission line and the peripheral linear optical transmission lines, and a second embodiment uses optical fibers with filter films attached to the end surfaces thereof for the central linear optical transmission line and the peripheral linear optical transmission lines. An example of a structure of the optical fiber which is used in the first and second embodiments is shown in FIG. 1.

Figure 1:
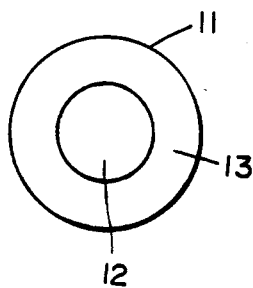
FIG. 1 is an example of the structure of an optical fiber used for an optical branching element according to the invention.

A optical fiber 11 is, as is shown in FIG. 1, composed of a core 12 and a cladding 13 provided outside the core 12.

In the first embodiment, optical fibers having this structure and the same diameters are used for the central linear optical transmission line and the peripheral linear optical transmission lines in this invention. A plurality of peripheral linear optical transmission lines are provided around the central linear optical transmission lines such that the end surfaces are on the same plane with and come into contact with the end surface of the central linear optical transmission line. The number of peripheral linear optical transmission lines used for the first embodiment is at the smallest two and at the largest six.

The central linear optical transmission line and the plurality of the peripheral linear optical transmission lines therearound are arranged as follows:

Two symmetrical points are selected as a symmetrical pair from among the six radially symmetrical points of the central linear optical transmission line in relation to the center of the central linear optical transmission line. The peripheral linear optical transmission lines are provided with the end surfaces thereof arranged on the same level as the end surface of the central linear optical transmission line such that the end surfaces come into contact with the end surface of the central linear optical transmission line at the selected symmetrical points.

Figure 2:
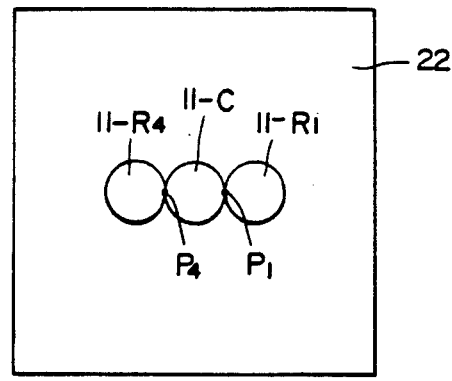
FIG. 2 is a plan view of the structure of the holder of a first embodiment of an optical branching element according to the invention.

In the arrangement shown in FIG. 2, a pair of diametrically opposite points $P_1$, $P_4$ are selected, and peripheral linear optical transmission lines 11 - R1 and 11 R4 are arranged such as to come into contact with the peripheral surface of a central linear optical transmission line 11 - C at the points $P_1$, $P_4$. This is an example of the first embodiment in which one diametrically opposite pair is selected and the minimum number of peripheral linear optical transmission lines are arranged around the central linear optical transmission line.

In this state, namely with the end surfaces of the central linear optical transmission line 11 - C and the peripheral linear optical transmission lines 11 - R1 and 11 - R4 arranged on the same plane and in contact with each other, a holder is secured to the end surfaces with its contacting surface on the same level as this same plane.

Figure 3:
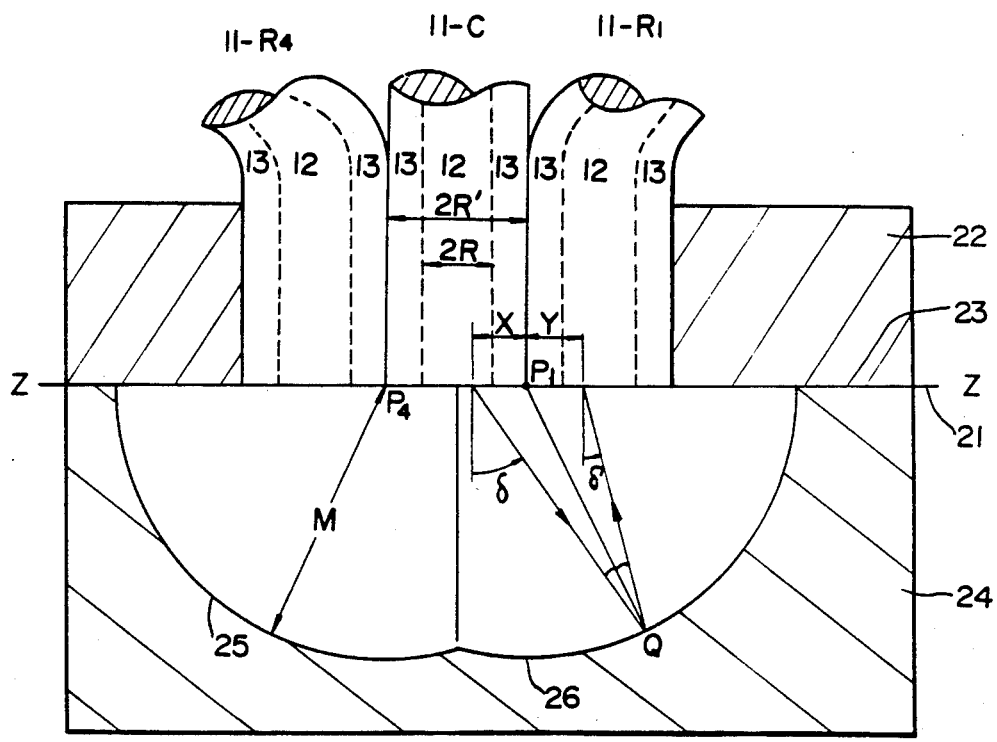
FIG. 3 is a sectional view of the embodiment of an optical branching element according to the invention which enables an explanation of the principle of the structure.

That is, as is shown in FIG. 3, the end surfaces of the central linear optical transmission line 11 - C and the peripheral linear optical transmission lines 11 - R1 and 11 - R4 are formed on a plane 21 and the holder 22 secures the end surfaces of these optical transmission lines with the end surfaces of the peripheral linear optical transmission lines 11 - R1 and 11 - R4 in contact with the end surface of the central linear optical transmission line 11 - C. A resin material, for example, is used for the holder 22. A plane contacting surface 23 is formed on the holder 22 such as to be in alignment with the plane 21.

Figure 4:
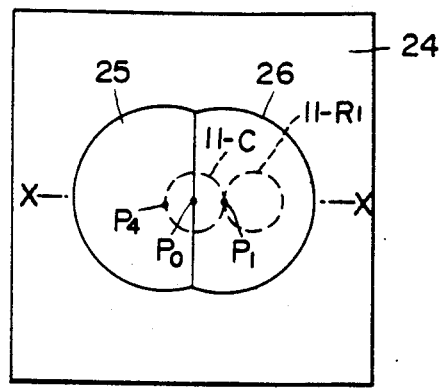
FIG. 4 is a plan view of the structure of the reflector of the embodiment of an optical branching element according to the invention.

A reflector 24 which is provided opposite to the contacting surface 23 of the holder 22 is formed of a synthetic resin or the like. In this reflector 24 semi-spherical reflecting concave surfaces 25, 26 having larger radii than the diameters of the peripheral linear optical transmission lines 11 - R1, 11 - R4 are formed around the center points $P_1$, $P_4$, respectively, where the peripheral linear optical transmission lines 11 - R1 and 11 - R4 are provided. These semi-spherical reflecting concave surfaces 25, 26 are connected to each other and form a reflecting concave surface in the reflector 24. As is shown in FIG. 4, the reflecting concave surface is formed of the semi-spherical reflecting concave surfaces 25, 26 in the reflector 24, and the section of this reflecting concave surface has the configuration shown in FIG. 3.

In this embodiment, the case will be explained where the light which is transmitted from the central linear optical transmission line 11 - C is branched and transmitted to the peripheral linear optical transmission lines 11 - R1 and 11 - R4.

Since this embodiment is symmetrical in arrangement in terms of the right and left sides, reflection on the semi-spherical reflecting concave surface 26 will here be explained. In FIG. 3, the light which is emitted from the central linear optical transmission line 11 - C at an angle of $\delta$ is reflected at a point Q of the semi-spherical reflecting concave surface 26, and enters the peripheral linear optical transmission line 11 - R1 at an incidence angle of $\delta'$. Supposing that the distances of the emitted light and incident light from the contacting point $P_1$ of the transmission line are x, y, respectively, the radius of the core and the cladding of the optical fibers which are used for the central and the peripheral linear optical transmission lines are R, R', respectively, and the radius of the semi-spherical reflecting concave surface 26 is M, the following formula is applicable to the light on the straight line X—X in FIG. 3.

$$y = Mx / \left( 2x \sin \frac{\delta + \delta'}{2} + M \right) \quad (1)$$

wherein $(R'-R) < x < (R'+R)$, and the sign of $\delta$ and $\delta'$ is positive when it is in the counterclockwise direction from the vertical line.

If the radii of the semi-spherical reflecting concave surfaces 25, 26 are adequately large as compared with the diameter of the cladding of the fiber, y approximately equals x and the positions of the incident light and the emitting light are in mirror like relation with respect to $P_1$. Therefore, at this time efficient branching from the central fiber to the peripheral fiber is possible. To meet the above-described condition, M is about 10 times R'.

The light which is not in exact correspondence with the straight line Z - Z' is also reflected symmetrically with respect to the point $P_1$ in the direction of the peripheral linear optical transmission line 11- R1. Therefore, the reflected light enters the end surface of the peripheral linear optical transmission line 11 - R1 and the transmission of light between the central linear optical transmission line 11 - C and the peripheral linear optical transmission line 11 - R1 is conducted with high efficiency. The transmission efficiency between the central linear optical transmission line 11 - C and the peripheral linear optical transmission line 11 - R4 is also very high.

Figure 5:
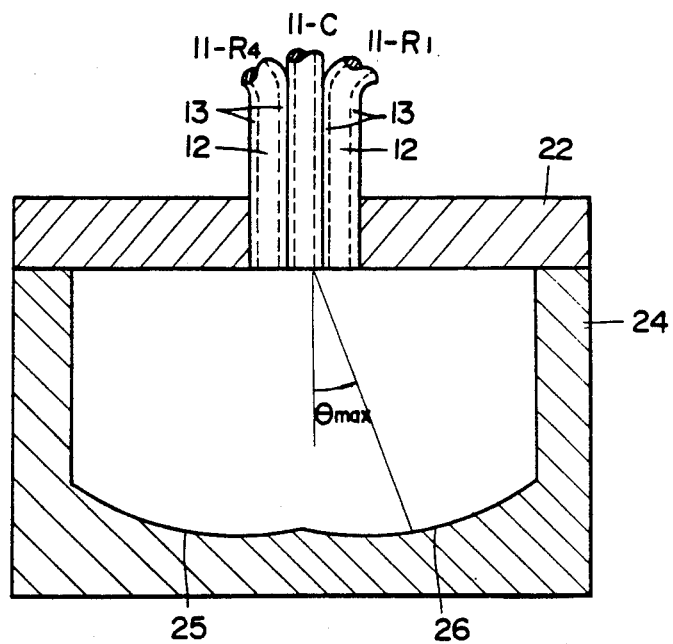
FIG. 5 shows the structure of the element shown in FIG. 3 in an improved form.

Since the light emitted from the fiber does not disperse more than $\theta$ max=$\sin^{-1}$ (N.A./n) (N.A.:numerical aperture; n:refractive index of a medium in the reflecting concave surface), it is unnecessary to make the reflecting concave surface completely semi-spherical, and a spherical surface of not smaller than (N.A.)$\times$M+R' is sufficient (e.g. FIG. 5). In this way, a smaller-sized element can be made.

In forming the reflector 24 of a synthetic resin, a mold used for the production of the reflecting concave surface which has a configuration of two semi-spherical reflecting concave surfaces 25, 26 which are connected to each other in succession is formed of a metal and by using this forming mold the reflector 24 having a reflecting concave surface is produced.

When the reflector 24 is formed of a metal material, a semi-spherical abrasive member of a radius of M is mounted on a rotary abrasive machine with the center of the abrasive member situated on the vertical line of the point $P_1$, and the metal material is subjected to a rotary abrasion, while being observed under a microscope, until the center reaches to the point $P_1$, the semi-spherical reflecting concave surface 26 thereby being produced. Thereafter the metal material is abrased by the same abrasive member in the same way until the center of the abrasive member reaches the point $P_4$ to obtain the semi-spherical reflecting concave surface 25. Finally the reflecting concave surface is formed in the reflector 24 by connecting the boundary of the semi-spherical reflecting concave surface 26 and the semi-spherical reflecting concave surface 25.

Figure 6:
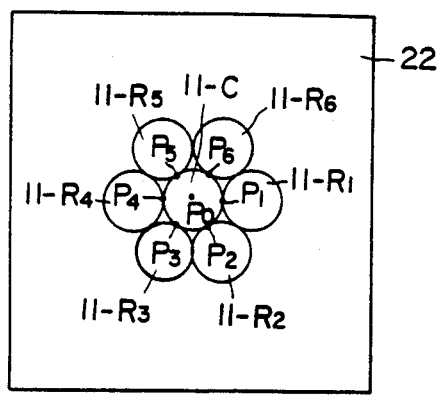
FIG. 6 is a plan view of another example of a holder of the embodiment of an optical branching element according to the invention.
Figure 7:
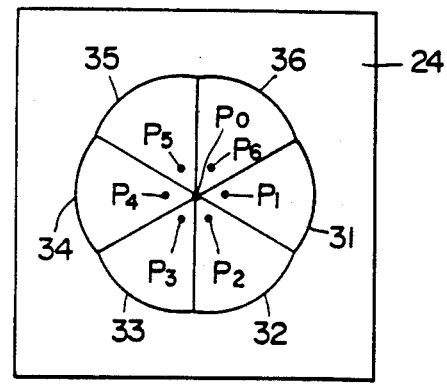
FIG. 7 is a plan view of another example of a reflector of the embodiment of an optical branching element according to the invention.

FIG. 6 shows the structure of the main part of the arrangement of the central linear optical transmission line and the peripheral linear optical transmission lines in an optical branching element according to the invention in which the peripheral linear optical transmission lines of the maximum number, namely six, are used. In this case, as is shown in FIG. 6, semi-spherical reflecting concave surfaces 31 to 36 are formed around all the six radially symmetrical points $P_1$ to $P_6$ in correspondence with the respective peripheral linear optical transmission lines 11 - R1 to 11 - R6. These semi-spherical reflecting concave surfaces are connected to each other at each boundary to form the reflecting concave surface in the reflector 24.

In this case, the light which is transmitted from each region of the end surface which is divided in the radial direction equally into six parts in relation to the center $P_0$ of the central linear optical transmission line 11 - C is reflected by the corresponding semi-spherical reflecting concave surfaces 31 to 36 and efficiently branched to the peripheral linear optical transmission lines 11 - R1 to 11 - R6.

In either of the examples shown in FIGS. 2 and 6, it is possible to branch light in the direction opposite to the case explained in the embodiment. In other words, it is possible to branch each light in the peripheral linear optical transmission lines to the central linear optical transmission line and join the branched light in the central linear optical transmission line.

It is also possible to heighten the branching properties by filling the gap between the contacting surface 23 of the holder 22 and the semi-spherical reflecting concave surface of the reflector 24 with an index matching liquid.

Figure 8:
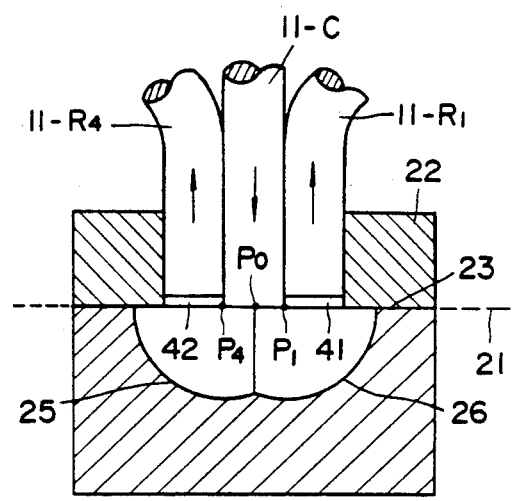
FIG. 8 is a sectional view of a second embodiment of an optical branching element according to the invention which enables an explanation of the principle of the structure.

FIG. 8 shows the structure of the main part of a second embodiment of an optical branching element according to the invention. This is an example of using an optical fiber for the central linear optical transmission line 11 - C and an optical fiber with filter films 41, 42 attached to the end surfaces for the peripheral linear optical transmission lines 11 - R1, 11 - R4, respectively.

In FIG. 8 is shown an example of providing the peripheral linear optical transmission lines 11 - R1 and 11 - R4 with end surfaces thereof in contact with the central linear optical transmission line 11 - C at the points $P_1$ and $P_4$ which are selected from among the six radially symmetrical points, but it is possible to make an optical branching element of a composition corresponding to the one shown in FIG. 6 by using all six of the radially symmetrical points. In this case also, the end surfaces of the central linear optical transmission line 11 - C and the peripheral linear optical transmission lines 11 - R1 to 11 - R6 are arranged on the same plane 21.

If a filter film 41 which transmits only wavelength $\lambda_1$, and a filter film 42 which transmits only wavelength $\lambda_2$ are attached, of the light transmitted from the central linear optical transmission line 11 - C, the light having a wavelength component of $\lambda_1$ is branched and transmitted to the peripheral linear optical transmission line 11 - R1 and the light having a wavelength component of $\lambda_2$ to the peripheral linear optical transmission line 11 - R4.

In this embodiment, it is also possible to attach a filter film which transmits only a predetermined wavelength to the end surface of the central linear optical transmission line 11 - C and to compose the peripheral linear optical transmission lines 11 - R1, 11 - R4 only of optical fibers so that of the light which is transmitted from the peripheral linear optical transmission lines 11 - R1, 11 - R4, only the predetermined wavelength component is transmitted to the central linear optical transmission line 11 - C.

In each embodiment, one pair or three pairs of diametrically opposite points are selected and the peripheral linear optical transmission lines are arranged around the central linear optical transmission line, but it is possible to select from the six radially symmetrical points a plurality of points in general, for example, to select one pair of diametrically opposite points and one other point, and to arrange the peripheral linear optical transmission lines at these selected points. An optical branching element according to the invention has a simple structure, its manufacture is comparatively easy, and it enables an accurate, efficiant and stable optical branching transmission between the central linear optical transmission line and the peripheral linear optical transmission lines without being affected by external influences such as heat or vibration. Further it is easy to arrange for an optical branching element according to the invention to have a wavelength transmitting property at the time of optical branching.

As has been described in detail, according to the invention it is possible to provide an optical branching element which has a simple and stable structure and which enables a highly accurate and efficient optical branching without involving any change in the optical transmission characteristics as a result of external influences such as heat or vibration.

While there has been described what are at present considered to be preferred embodiments of the invention, it will be understood that various modifications may be made therein, and it is intended that the appended claims cover all such modifications as fall within the true spirit and scope of the invention.

What is claimed is:

1. An optical branching element which comprises
a central optical transmission line, said central optical transmission line having a circular cross section and a predetermined diameter and a straight end portion, said straight end portion including a flat end surface which is perpendicular to an imaginary center line which extends through said straight end portion, said flat end surface defining an imaginary plane,
a plurality of peripheral optical transmission lines, each peripheral optical transmission line having a circular cross section and a diameter which is about the same as said predetermined diameter of said central optical transmission line, each peripheral optical transmission line having a straight end portion which defines a flat end surface which is perpendicular to an imaginary center line which extends through the associated straight end portion, the straight end portion of each peripheral optical transmission line being positioned with respect to the straight end portion of said central optical transmission line such that they are in contact with the straight end portion of said central optical transmission line and such that the flat end surfaces thereof are positioned in said imaginary plane, the flat end surfaces of said peripheral optical transmission lines contacting the flat end surface of said central optical transmission line at respective contact points,
a holder in which the straight end portions of said central optical transmission line and said plurality of peripheral optical transmission lines extend, said holder maintaining contact between said central optical transmission line and said peripheral optical transmission lines and maintaining the flat end surfaces thereof in said imaginary plane, said holder including a flat contacting surface which is located in said imaginary plane, and
a reflector which is in contact with the flat contacting surface of said holder and which includes means forming a concave reflecting surface therein which faces said end surfaces of the straight end portions of said central optical transmission line and said peripheral optical transmission lines, said concave reflecting surface being symmetrical about a center point which is located on said imaginary center line which extends through said straight end portion of said central optical transmission line, said concave reflecting surface being formed of a plurality of reflective surface portions, the number of reflective surface portions equalling the number of peripheral optical transmission lines, each reflective surface portion having a semi-spherical surface which is defined by a predetermined radius from a respective said contact point, said predetermined radius being larger than the diameter of the peripheral optical transmission line with which the reflective surface portion is associated.

2. An optical branching element according to claim 1, wherein said reflector is formed of a synthetic resin.

3. An optical branching element according to claim 1, wherein each of said reflective surface portions is coated with a gold film.

4. An optical branching element according to claim 3, wherein said film is formed by metalizing.

5. An optical branching element according to claim 1, wherein a gap between the contacting surface of the holder and the means forming a concave reflecting surface is filled with an index matching liquid.

6. An optical branching element according to claim 5, wherein said index matching liquid is glycerin.

7. An optical branching element according to claim 1, wherein filter films are positioned over the flat end surfaces of said peripheral optical transmission lines.

8. An optical branching element according to claim 7, wherein each of said filter films transmits only a predetermined wavelength.

9. An optical branching element according to claim 1, wherein each of said reflective surface portions is coated with a chrome film.

10. An optical branching element according to claim 1, wherein each of said reflective surface portions is coated with an aluminum film.

11. An optical branching element according to claim 3, wherein said film is formed by plating.

* * * * *